United States Patent
McDowell

(10) Patent No.: US 9,600,400 B1
(45) Date of Patent: Mar. 21, 2017

(54) PERFORMANCE TESTING OF WEB APPLICATION COMPONENTS USING IMAGE DIFFERENTIATION

(71) Applicant: Vertafore, Inc., Bothell, WA (US)

(72) Inventor: Kevin R. McDowell, Monroe, WA (US)

(73) Assignee: Vertafore, Inc., Bothell, WA (US)

( * ) Notice: Subject to any disclaimer, the term of this patent is extended or adjusted under 35 U.S.C. 154(b) by 0 days.

(21) Appl. No.: 14/926,465

(22) Filed: Oct. 29, 2015

(51) Int. Cl.
G06F 9/44 (2006.01)
G06F 11/36 (2006.01)
G06K 9/62 (2006.01)
G06K 9/20 (2006.01)
G06F 11/34 (2006.01)

(52) U.S. Cl.
CPC ...... *G06F 11/3664* (2013.01); *G06F 11/3495* (2013.01); *G06F 11/3692* (2013.01); *G06K 9/2081* (2013.01); *G06K 9/6215* (2013.01)

(58) Field of Classification Search
CPC ............. G06F 11/3664; G06F 11/3692; G06F 11/3495; G06K 9/6215; G06K 9/2081
USPC ................................. 717/124–125
See application file for complete search history.

(56) References Cited

U.S. PATENT DOCUMENTS

| | | | |
|---|---|---|---|
| 3,970,992 A | 7/1976 | Boothroyd et al. | |
| 4,346,442 A | 8/1982 | Musmanno | |
| 4,347,568 A | 8/1982 | Giguere et al. | |
| 4,359,631 A | 11/1982 | Lockwood et al. | |
| 4,383,298 A | 5/1983 | Huff et al. | |
| 4,410,940 A | 10/1983 | Carlson et al. | |
| 4,429,360 A | 1/1984 | Hoffman et al. | |
| 4,486,831 A | 12/1984 | Wheatley et al. | |
| 4,491,725 A | 1/1985 | Pritchard | |

(Continued)

FOREIGN PATENT DOCUMENTS

| CA | 2646167 A1 | 10/2004 |
|---|---|---|
| CA | 2649441 A1 | 10/2007 |

(Continued)

OTHER PUBLICATIONS

Yuan et al., "Using GUI Run-Time Sate as Feedback to Generate Test Cases," 29th International Conference on Software Engineering, IEEE 2007, 10 pages.

(Continued)

*Primary Examiner* — Camquy Truong
(74) *Attorney, Agent, or Firm* — Seed IP Law Group LLP

(57) ABSTRACT

Systems and methods for measuring the rendering time for individual components of a software application, such as a single page application (SPA). Baseline screenshots are captured for specific screen regions associated with selected components. After invalidating associated application caches, one or more selected components are reloaded. After respective server calls complete, which time corresponds to rendering start times, test screenshots of the specified regions are captured during re-rendering and are compared to their corresponding baseline screenshots. When a match is found for a component under test, the time the match is found is marked as a rendering completion time. The rendering completion time for each component may be compared to the corresponding rendering start time to determine the amount of time taken to render each of the components of the application.

23 Claims, 9 Drawing Sheets

(56) References Cited

U.S. PATENT DOCUMENTS

| | | |
|---|---|---|
| 4,503,499 A | 3/1985 | Mason et al. |
| 4,553,206 A | 11/1985 | Smutek et al. |
| 4,567,359 A | 1/1986 | Lockwood |
| 4,591,974 A | 5/1986 | Dornbush et al. |
| 4,598,367 A | 7/1986 | DeFrancesco et al. |
| 4,633,430 A | 12/1986 | Cooper |
| 4,642,768 A | 2/1987 | Roberts |
| 4,646,229 A | 2/1987 | Boyle |
| 4,646,231 A | 2/1987 | Green et al. |
| 4,646,250 A | 2/1987 | Childress |
| 4,648,037 A | 3/1987 | Valentino |
| 4,658,351 A | 4/1987 | Teng |
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,864,340 A | 1/1999 | Bertram et al. |
| 5,880,724 A | 3/1999 | Bertram et al. |
| 5,968,125 A | 10/1999 | Garrick et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,240,416 B1 | 5/2001 | Immon et al. |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,393,438 B1 | 5/2002 | Kathrow et al. |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,592,629 B1 | 7/2003 | Cullen et al. |
| 6,601,047 B2 | 7/2003 | Wang et al. |
| 6,658,167 B1 | 12/2003 | Lee et al. |
| 6,658,659 B2 | 12/2003 | Hiller et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,000,230 B1 | 2/2006 | Murray et al. |
| 7,010,503 B1 | 3/2006 | Oliver et al. |
| 7,020,779 B1 | 3/2006 | Sutherland |
| 7,028,223 B1 | 4/2006 | Kolawa et al. |
| 7,146,495 B2 | 12/2006 | Baldwin et al. |
| 7,178,110 B2 | 2/2007 | Fujino |
| 7,191,195 B2 | 3/2007 | Koyama et al. |
| 7,206,998 B2 | 4/2007 | Pennell et al. |
| 7,266,537 B2 | 9/2007 | Jacobsen et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 | 10/2008 | Chidlovskii |
| 7,478,064 B1 | 1/2009 | Nacht |
| 7,574,048 B2 | 8/2009 | Shilman et al. |
| 7,584,196 B2 | 9/2009 | Reimer et al. |
| 7,587,327 B2 | 9/2009 | Jacobs et al. |
| 7,593,532 B2 | 9/2009 | Plotkin et al. |
| 7,624,189 B2 | 11/2009 | Bucher |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,711,703 B2 | 5/2010 | Smolen et al. |
| 7,725,456 B2 | 5/2010 | Augustine |
| 7,757,168 B1 | 7/2010 | Shanahan et al. |
| 7,814,078 B1 | 10/2010 | Forman et al. |
| 7,836,291 B2 | 11/2010 | Yim et al. |
| 7,886,046 B1 | 2/2011 | Zeitoun et al. |
| 7,930,757 B2 | 4/2011 | Shapiro et al. |
| 7,949,711 B2 | 5/2011 | Chang et al. |
| 7,996,759 B2 | 8/2011 | Elkady |
| 7,996,870 B2 | 8/2011 | Suzuki |
| 8,140,589 B2 | 3/2012 | Petri |
| 8,146,058 B2 | 3/2012 | Sarkar et al. |
| 8,166,388 B2 | 4/2012 | Gounares et al. |
| 8,171,404 B2 | 5/2012 | Borchers et al. |
| 8,234,219 B2 | 7/2012 | Gorczowski et al. |
| 8,266,592 B2 | 9/2012 | Beto et al. |
| 8,285,685 B2 | 10/2012 | Prahlad et al. |
| 8,290,971 B2 | 10/2012 | Klawitter et al. |
| 8,321,483 B2 | 11/2012 | Serlet et al. |
| 8,355,934 B2 | 1/2013 | Virdhagriswaran |
| 8,370,403 B2 | 2/2013 | Matsuki |
| 8,438,045 B2 | 5/2013 | Erlanger |
| 8,458,582 B2 | 6/2013 | Rogers et al. |
| 8,650,043 B1 | 2/2014 | Phillips |
| 8,667,267 B1 | 3/2014 | Garcia et al. |
| 8,725,682 B2 | 5/2014 | Young et al. |
| 8,731,973 B2 | 5/2014 | Anderson et al. |
| 8,825,626 B1 | 9/2014 | Wallace et al. |
| 8,832,045 B2 | 9/2014 | Dodd et al. |
| 9,063,932 B2 | 6/2015 | Bryant et al. |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0087602 A1 | 7/2002 | Masuda et al. |
| 2002/0120474 A1 | 8/2002 | Hele et al. |
| 2002/0120776 A1 | 8/2002 | Eggebraaten et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0144887 A1 | 7/2003 | Debber |

(56) References Cited

U.S. PATENT DOCUMENTS

| | | |
|---|---|---|
| 2003/0191938 A1 | 10/2003 | Woods et al. |
| 2003/0212610 A1 | 11/2003 | Duffy et al. |
| 2004/0039757 A1 | 2/2004 | McClure |
| 2004/0059592 A1 | 3/2004 | Yadav-Ranjan |
| 2004/0059740 A1 | 3/2004 | Hanakawa et al. |
| 2004/0133606 A1 | 7/2004 | Miloushev et al. |
| 2004/0186750 A1 | 9/2004 | Surbey et al. |
| 2004/0193455 A1 | 9/2004 | Kellington |
| 2004/0194026 A1 | 9/2004 | Barrus et al. |
| 2004/0220975 A1 | 11/2004 | Carpentier et al. |
| 2004/0230903 A1 | 11/2004 | Elza et al. |
| 2004/0236614 A1 | 11/2004 | Keith |
| 2004/0243969 A1 | 12/2004 | Kamery et al. |
| 2004/0255275 A1 | 12/2004 | Czerwonka |
| 2004/0267578 A1 | 12/2004 | Pearson |
| 2005/0024387 A1 | 2/2005 | Ratnakar et al. |
| 2005/0033988 A1 | 2/2005 | Chandrashekhar et al. |
| 2005/0071203 A1 | 3/2005 | Maus |
| 2005/0080804 A1 | 4/2005 | Bradshaw, Jr. et al. |
| 2005/0137928 A1 | 6/2005 | Scholl et al. |
| 2005/0144195 A1 | 6/2005 | Hesselink et al. |
| 2005/0233287 A1 | 10/2005 | Bulatov et al. |
| 2006/0047540 A1 | 3/2006 | Hutten et al. |
| 2006/0059338 A1 | 3/2006 | Feinleib et al. |
| 2006/0100912 A1 | 5/2006 | Kumar et al. |
| 2006/0184452 A1 | 8/2006 | Barnes et al. |
| 2006/0195491 A1 | 8/2006 | Nieland et al. |
| 2006/0195494 A1 | 8/2006 | Dietrich |
| 2006/0259524 A1 | 11/2006 | Horton |
| 2007/0006222 A1 | 1/2007 | Maier et al. |
| 2007/0016465 A1 | 1/2007 | Schaad |
| 2007/0016829 A1 | 1/2007 | Subramanian et al. |
| 2007/0061154 A1 | 3/2007 | Markvoort et al. |
| 2007/0067772 A1 | 3/2007 | Bustamante |
| 2007/0160070 A1 | 7/2007 | Buchhop et al. |
| 2007/0186066 A1 | 8/2007 | Desai et al. |
| 2007/0186214 A1 | 8/2007 | Morgan |
| 2007/0244921 A1 | 10/2007 | Blair |
| 2007/0244935 A1 | 10/2007 | Cherkasov |
| 2007/0245230 A1 | 10/2007 | Cherkasov |
| 2007/0282927 A1 | 12/2007 | Polouetkov |
| 2008/0002830 A1 | 1/2008 | Cherkasov et al. |
| 2008/0010542 A1 | 1/2008 | Yamamoto et al. |
| 2008/0040690 A1 | 2/2008 | Sakai |
| 2008/0086499 A1 | 4/2008 | Wefers et al. |
| 2008/0091846 A1 | 4/2008 | Dang |
| 2008/0120602 A1 | 5/2008 | Comstock et al. |
| 2009/0007077 A1 | 1/2009 | Musuvathi et al. |
| 2009/0055242 A1 | 2/2009 | Rewari et al. |
| 2009/0119133 A1 | 5/2009 | Yeransian et al. |
| 2009/0199160 A1 | 8/2009 | Vaitheeswaran et al. |
| 2009/0271779 A1 | 10/2009 | Clark |
| 2009/0282457 A1 | 11/2009 | Govindavajhala |
| 2009/0287746 A1 | 11/2009 | Brown |
| 2009/0328171 A1 | 12/2009 | Bayus et al. |
| 2010/0060926 A1 | 3/2010 | Smith et al. |
| 2010/0064230 A1 | 3/2010 | Klawitter et al. |
| 2010/0064258 A1 | 3/2010 | Gorczowski et al. |
| 2010/0091317 A1 | 4/2010 | Williams et al. |
| 2010/0161616 A1 | 6/2010 | Mitchell |
| 2010/0179883 A1 | 7/2010 | Devolites |
| 2010/0199263 A1 | 8/2010 | Clee et al. |
| 2010/0235392 A1 | 9/2010 | McCreight et al. |
| 2011/0021250 A1 | 1/2011 | Ickman et al. |
| 2011/0088014 A1 | 4/2011 | Becker et al. |
| 2011/0145037 A1 | 6/2011 | Domashchenko et al. |
| 2011/0161375 A1 | 6/2011 | Tedder et al. |
| 2011/0173153 A1 | 7/2011 | Domashchenko et al. |
| 2011/0184689 A1 | 7/2011 | Awedikian et al. |
| 2011/0270975 A1 | 11/2011 | Troup |
| 2011/0276875 A1 | 11/2011 | McCabe et al. |
| 2011/0283177 A1 | 11/2011 | Gates et al. |
| 2012/0150919 A1 | 6/2012 | Brown et al. |
| 2012/0159647 A1 | 6/2012 | Sanin et al. |
| 2012/0174069 A1* | 7/2012 | Zavatone ............ G06F 11/3692 717/124 |
| 2012/0222014 A1 | 8/2012 | Peretz et al. |
| 2012/0232934 A1 | 9/2012 | Zhang et al. |
| 2013/0024418 A1 | 1/2013 | Sitrick et al. |
| 2013/0054480 A1 | 2/2013 | Ross et al. |
| 2013/0066901 A1 | 3/2013 | Marcelais et al. |
| 2013/0073942 A1 | 3/2013 | Cherkasov |
| 2013/0080760 A1 | 3/2013 | Li et al. |
| 2013/0138555 A1 | 5/2013 | Shishkov |
| 2013/0152047 A1 | 6/2013 | Moorthi et al. |
| 2013/0212692 A1 | 8/2013 | Sher-Jan et al. |
| 2013/0239217 A1 | 9/2013 | Kindler et al. |
| 2013/0282406 A1 | 10/2013 | Snyder et al. |
| 2013/0282407 A1 | 10/2013 | Snyder et al. |
| 2013/0282408 A1 | 10/2013 | Snyder et al. |
| 2013/0290786 A1 | 10/2013 | Artzi et al. |
| 2013/0298256 A1 | 11/2013 | Barnes et al. |
| 2014/0040867 A1 | 2/2014 | Wefers et al. |
| 2014/0067428 A1 | 3/2014 | Snyder et al. |
| 2014/0075500 A1 | 3/2014 | B'Far et al. |
| 2014/0096262 A1 | 4/2014 | Casso |
| 2014/0282977 A1 | 9/2014 | Madhu et al. |
| 2014/0283098 A1 | 9/2014 | Phegade et al. |
| 2014/0337973 A1 | 11/2014 | Foster et al. |
| 2014/0358938 A1 | 12/2014 | Billmaier et al. |
| 2015/0161121 A1 | 6/2015 | Alvarez |
| 2015/0161538 A1 | 6/2015 | Matus et al. |
| 2015/0161620 A1 | 6/2015 | Christner |
| 2015/0169432 A1 | 6/2015 | Sinyagin et al. |
| 2015/0215332 A1 | 7/2015 | Curcic et al. |
| 2016/0055132 A1 | 2/2016 | Garrison et al. |
| 2016/0103853 A1* | 4/2016 | Kritt ............... G06F 17/3087 707/758 |
| 2016/0104132 A1 | 4/2016 | Abbatiello et al. |

FOREIGN PATENT DOCUMENTS

| | | |
|---|---|---|
| CA | 2761405 A1 | 6/2012 |
| CA | 2733857 A1 | 9/2012 |
| CA | 2737734 A1 | 10/2012 |
| EP | 0585192 A1 | 3/1994 |
| JP | 60-41138 A | 3/1985 |
| JP | 3-282941 A | 12/1991 |
| JP | 4-373026 A | 12/1992 |
| JP | 11-143567 A | 5/1999 |
| JP | 11-296452 A | 10/1999 |
| WO | 01/95093 A2 | 12/2001 |
| WO | 2004/088543 A1 | 10/2004 |
| WO | 2007/120771 A2 | 10/2007 |
| WO | 2007/120772 A2 | 10/2007 |
| WO | 2007/120773 A2 | 10/2007 |
| WO | 2007/120774 A2 | 10/2007 |
| WO | 2008/049871 A1 | 5/2008 |
| WO | 2010/030675 A1 | 3/2010 |
| WO | 2010/030676 A1 | 3/2010 |
| WO | 2010/030677 A1 | 3/2010 |
| WO | 2010/030678 A1 | 3/2010 |
| WO | 2010/030679 A1 | 3/2010 |
| WO | 2010/030680 A1 | 3/2010 |
| WO | 2013/072764 A2 | 5/2013 |

OTHER PUBLICATIONS

Woo et al., "Meaningful interaction in web-based learning: A social constructivist interpretation," Internet and Higher Education 10(1):15-25, 2007.

"AMS Real-Time Getting Started Guide," AMS Services, Vertafore, Inc., 9 pages, 2008.

"VERITAS Replication Exec version 3.1 for Windows," Administrator's Guide, pp. i-20, 49-68, and 119-160, Dec. 2004, 100 pages.

"Update insurance template according to changes in policy," retrieved from https://www.google.com/?tbm=pts, on Sep. 24, 2012, 2 pages.

"Adobe Introduces Adobe Acrobat 3.0 Software," *PR Newswire*, Jun. 3, 1996, 3 pages.

(56) References Cited

OTHER PUBLICATIONS

"CoreData Inc. Announces Technology and Marketing Agreement with MobileStar Network Corp.," *Business Wire*, Aug. 26, 1998, 2 pages.
"CoreData Offers E-mail Connectivity for RemoteWorx,"*Newsbytes News Network*, Sep. 18, 1998, 1 page.
"Free Sticky Notes software—Sticky Notes program MoRUN.net Sticker Lite," Jan. 11, 2006, retrieved from http://web.archive.org/web/20060112031435/http://www.sticky-notes.net/free/stickynotes.html, on Oct. 10, 2013, 2 pages.
"Internet lifts servers to 64 bits," *Electronic Engineering Times*, Dec. 23, 1996, 3 pages.
"NotesPlusPlus," Feb. 25, 2006, retrieved from http://web.archive.org/web/20060225020405/http://www.shareware connection.com/notesplusplus.htm, on Oct. 10, 2013, 2 pages.
"SPSS Unveils Aggressive Development Plans: 1999 Product Releases Will Focus on Scalability and Deployment Solutions for the Enterprise," *Business Wire*, Feb. 18, 1999, 3 pages.
"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.
Announcement, "Coming Attraction, AMS Invites you to a Special Sneak Preview," AMS Services, 1 page, Aug. 1, 2008.
Batrouni et al., "Method and System of Assessing Risk Associated With Users Based at Least in Part on Online Presence of the User," U.S. Appl. No. 14/630,509, filed Feb. 24, 2015, 71 pages.
Brochure, "AMS 360—Business Growth. Productivity. Proven Technology.," Vertafore, Inc., 8 pages, 2008.
Brown et al., "Agency Management System and Content Management System Integration," U.S. Appl. No. 61/422,090, filed Dec. 10, 2010, 54 pages.
Corriveau et al., "AMS Portal Server: Bridging the Gap Between Web Presentation and the Back Office," White Paper, AMS Services, 13 pages, 2008.
Extended European Search Report, dated Jul. 9, 2012, for Application No. 07755347.7, 8 pages.
Extended European Search Report, dated Jun. 14, 2012, for Application No. 07755348.5, 8 pages.
Extended European Search Report, dated Jun. 19, 2012, for Application No. 07755349.3, 8 pages.
Extended European Search Report, dated Jun. 14, 2012, for Application No. 07755350.1, 9 pages.
Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.
Gadia, "A Homogeneous Relational Model and Query Languages for Temporal Databases," *ACM Transactions on Database Systems* 13(4):418-448, Dec. 1988.
Gage, "Sun's 'objective' is to populate Java networks," *Computer Reseller News*, Apr. 15, 1996, p. 69, 2 pages.
International Search Report and Written Opinion, mailed Aug. 5, 2008, for PCT/US2007/009040, 7 pages.
International Search Report and Written Opinion, mailed Jul. 18, 2008, for PCT/US2007/009041, 8 pages.
International Search Report and Written Opinion, mailed Jul. 14, 2008, for PCT/US2007/009042, 6 pages.
International Search Report and Written Opinion, mailed Jul. 18, 2008, for PCT/US2007/009043, 9 pages.
Murdock, "Office Automation System for Data Base Management and Forms Generation," U.S. Appl. No. 07/471,290, filed Jan. 26, 1990, 163 pages.
Snodgrass et al., "Temporal Databases," IEEE Computer, Sep. 1986, pp. 35-42.
Srivastava et al., "Automated Software Testing Using Metahurestic Technique Based on an Ant Colony Optimization," International Symposium on Electronic System Design, Bhubaneswar, Dec. 20-22, 2010, 7 pages.

* cited by examiner

ACT

ONCE TEST SCREENSHOT
MATCHES, MARK TIME AND
CALCULATE RENDERING TIME

TIMES:

RENDERING MATCH,
11:31:48.88

RENDERING TIME =
11:31:48.88 –
11:31:48.27

RENDERING TIME = 610
MILLISECONDS

SCREEN

FIG.9

PERFORMANCE TESTING OF WEB APPLICATION COMPONENTS USING IMAGE DIFFERENTIATION

BACKGROUND

Technical Field

The present disclosure generally relates to performance testing of software applications.

Description of the Related Art

Web browsers function as user-friendly portals to the Internet's resources which facilitate navigation and information search. Recently, Web browsers have evolved into more sophisticated and complex software applications. Current Web browsers incorporate sophisticated multimedia rendering functions (e.g., video, audio, images) and enable a user to navigate and interact dynamically with connected Websites and other internet users.

Uniform resource locators (URLs) are the addresses of internet resources on the World Wide Web. A common URL contains a character string "http" which identifies the URL as a resource to be retrieved over the Hypertext Transfer Protocol (HTTP). Other common prefixes are "https" (for Hypertext Transfer Protocol Secure), "ftp" (for File Transfer Protocol), and "file" (for files that are stored locally on a user's computer). If a URL points to a Website, which is often a case, the Web browser uses the URL to access the Website and retrieve the Webpage from the Website.

Once the Webpage has been retrieved by a processor-based system, the Web browser displays the Webpage on a display screen of the processor-based system. Hypertext Markup Language (HTML) documents and any associated content (e.g., text, images, video, audio) are passed to the Web browser's rendering or layout engine to be transformed from markup to an interactive document, a process known as "rendering." Webpages frequently include other content such as formatting information (e.g., Cascading Style Sheets (CSS)) and scripts (e.g., JavaScript) into their final presentation.

A Web application is a computer software application that is coded in a Web browser-supported programming language (e.g., HTML, JavaScript) and is reliant on a Web browser to render the application executable. Available Web browsers include, for example, Internet Explorer®, Google Chrome®, Mozilla Firefox®, Opera® and Safari®.

Often, software applications are implemented as a single page Web application (SPA). An SPA is a Web application or Website that fits on a single Webpage with the goal of providing a more fluid user experience similar to a desktop or "native" application. In an SPA, either all of the necessary code (e.g., HTML, JavaScript, CSS) is retrieved with a single page load, or the appropriate resources are dynamically loaded and added to the page as necessary, usually in response to user actions. The page does not reload at any point in the session, nor does control transfer to another page, although modern Web technologies (e.g., HTML5 pushState( ) API) may provide the perception and navigability of separate logical pages in the application. Interaction with the SPA often involves dynamic communication with one or more Web servers behind the scenes.

Normally, an SPA is fully loaded in the initial page load and then page regions or components are replaced or updated with new page components loaded from one or more of the Web servers on demand. To avoid excessive downloading of unused features, an SPA may progressively download more components as they become required.

When an SPA loads, each of the components loads at different speeds, depending on the type, quantity and source of data being loaded into each of the components. For performance testing, once data has been returned from a corresponding Web service for each component, it would be advantageous for developers to be able to benchmark and track load times for each component to identify potential performance issues. Currently, there is no easy way to find out how long a single component in a single-page application takes to load without making changes to the application source code.

BRIEF SUMMARY

A processor-based system to evaluate performance of an application may be summarized as including: at least one nontransitory processor-readable medium that stores at least one of processor-executable instructions or data; and at least one processor communicably coupled to the at least one nontransitory processor-readable medium, the at least one processor: receives a selection of a plurality of user interface components of the application rendered on a display screen of the processor-based system; for each of the plurality of selected user interface components, causes a corresponding plurality of baseline screenshot images to be captured, each of the baseline screenshot images depicting a region of the display screen which renders a corresponding selected user interface component; logically associates each of the captured baseline screenshot images with a corresponding one of the selected user interface components in a nontransitory processor-readable storage medium; for each of the selected user interface components, causes a data call request for the user interface component to be sent to a server processor-based system; detects a completion of a response from the server processor-based system received by the processor-based system responsive to the sent data call request; detects a response completion time of the completion of the response from the server processor-based system, the detected response completion time indicative of a starting time at which the user interface is re-rendered responsive to the sent data call request; logically associates the response completion time as a rendering starting time for the user interface component in the nontransitory processor-readable storage medium; causes a test screenshot image of the region which renders the user interface component to be captured; determines whether the captured test screenshot image matches the baseline screenshot image for the user interface component; while the captured test screenshot image does not match the baseline screenshot image, iteratively: causes a test screenshot image of the region which renders the user interface component to be captured; and determines whether the captured test screenshot image matches the baseline screenshot image for the user interface component; responsive to a determination that the captured test screenshot image matches the baseline screenshot image, detects a rendering completed time which represents the time at which the captured test screenshot image was found to match the baseline screenshot image; and determines a rendering execution time for the user interface component based at least in part on the rendering completed time for the user interface component and the rendering starting time for the user interface component.

The at least one processor: may determine a difference between the rendering completed time for the user interface component and the rendering starting time to obtain the rendering execution time for the user interface component. The at least one processor: prior to causing a data call request for the user interface component to be sent to a server processor-based system, may invalidate at least one cache storage which stores data for at least one of the plurality of selected user interface components of the application. The at least one processor: may cause a request for the application to be reloaded to be sent to the server processor-based system. The at least one processor: may receive a selection of a plurality of user interface components from a user via a graphical user interface of the processor-based system. The at least one processor: for each of the user interface components, may receive a selection of a region of the display screen of the processor-based system via a graphical user interface of the processor-based system. The at least one processor: for each of the user interface components, may receive a selection of an alphanumeric label for the user interface component. The at least one processor: responsive to receipt of the selection of a plurality of user interface components, may determine a region for each of the plurality of corresponding baseline screenshot images. At least one region may overlap with at least one other region. Each of the determined regions may be a rectangular-shaped region. The application may include la single page web application rendered on the display screen of the processor-based system.

A method of operating a processor-based system to evaluate performance of an application may be summarized as including: receiving, by at least one processor, a selection of a plurality of user interface components of the application rendered on a display screen of the processor-based system; for each of the plurality of selected user interface components, causing, by the at least one processor, a corresponding plurality of baseline screenshot images to be captured, each of the baseline screenshot images depicting a region of the display screen which renders a corresponding selected user interface component; logically associating, by the at least one processor, each of the captured baseline screenshot images with a corresponding one of the selected user interface components in a nontransitory processor-readable storage medium; for each of the selected user interface components, causing, by the at least one processor, a data call request for the user interface component to be sent to a server processor-based system; detecting, by the at least one processor, a completion of a response from the server processor-based system received by the processor-based system responsive to the sent data call request; detecting, by the at least one processor, a response completion time of the completion of the response from the server processor-based system, the detected response completion time indicative of a starting time at which the user interface is re-rendered responsive to the sent data call request; logically associating, by the at least one processor, the response completion time as a rendering starting time for the user interface component in the nontransitory processor-readable storage medium; causing, by the at least one processor, a test screenshot image of the region which renders the user interface component to be captured; determining, by the at least one processor, whether the captured test screenshot image matches the baseline screenshot image for the user interface component; while the captured test screenshot image does not match the baseline screenshot image, iteratively: causing, by the at least one processor, a test screenshot image of the region which renders the user interface component to be captured; and determining, by the at least one processor, whether the captured test screenshot image matches the baseline screenshot image for the user interface component; responsive to determining the captured test screenshot image matches the baseline screenshot image, detecting, by the at least one processor, a rendering completed time which represents the time at which the captured test screenshot image was found to match the baseline screenshot image; and determining, by the at least one processor, a rendering execution time for the user interface component based at least in part on the rendering completed time for the user interface component and the rendering starting time for the user interface component.

Determining a rendering execution time may include determining, by the at least one processor, a difference between the rendering completed time for the user interface component and the rendering starting time to obtain the rendering execution time for the user interface component. The method may further include: prior to causing a data call request for the user interface component to be sent to a server processor-based system, invalidating at least one cache storage which stores data for at least one of the plurality of selected user interface components of the application. Causing a data call request for the user interface component to be sent to a server processor-based system may include causing a request for the application to be reloaded to be sent to the server processor-based system. Receiving a selection of a plurality of user interface components may include receiving a selection of a plurality of user interface components from a user via a graphical user interface of the processor-based system. Receiving a selection of a plurality of user interface components may include, for each of the user interface components, receiving a selection of a region of the display screen of the processor-based system via a graphical user interface of the processor-based system. Receiving a selection of a plurality of user interface components may include, for each of the user interface components, receiving a selection of an alphanumeric label for the user interface component. The method may further include: responsive to receiving the selection of a plurality of user interface components, determining, by the at least one processor, a region for each of the plurality of corresponding baseline screenshot images. Determining a region for each of the plurality of corresponding baseline screenshot images may include determining a region for each of the plurality of corresponding baseline screenshot images, at least one region overlaps with at least one other region. Determining a region for each of the plurality of corresponding baseline screenshot images may include determining a rectangular-shaped region for each of the plurality of corresponding baseline screenshot images. Receiving, by at least one processor, a selection of a plurality of user interface components of the application rendered on a display screen of the processor-based system may include receiving a selection of a plurality of user interface components of a single page web application rendered on the display screen of the processor-based system.

A method of operating a processor-based system to evaluate performance of an application may be summarized as including: for each of a plurality of user interface components, causing, by the at least one processor, a corresponding plurality of baseline screenshot images to be captured, each of the baseline screenshot images depicting a region which renders a corresponding user interface component; causing, by the at least one processor, a reload request for the application to be sent to a server processor-based system; for each of the user interface components, detecting, by the at least one processor, a completion of a response from the server processor-based system received by the processor-based system; detecting, by the at least one processor, a response completion time of the completion of the response from the server processor-based system; logically associating, by the at least one processor, the response completion time as a rendering starting time for the user interface component in a nontransitory processor-readable storage medium; causing, by the at least one processor, a test screenshot image of the region which renders the user interface component to be captured; determining, by the at least one processor, whether the captured test screenshot image matches the baseline screenshot image for the user interface component; while the captured test screenshot image does not match the baseline screenshot image, iteratively: causing, by the at least one processor, a test screenshot image of the region which renders the user interface component to be captured; and determining, by the at least one processor, whether the captured test screenshot image matches the baseline screenshot image for the user interface component; responsive to determining the captured test screenshot image matches the baseline screenshot image, detecting, by the at least one processor, a rendering completed time which represents the time at which the captured test screenshot image was found to match the baseline screenshot image; and determining, by the at least one processor, a rendering execution time for the user interface component based at least in part on the rendering completed time for the user interface component and the rendering starting time for the user interface component.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 9 is a screenshot of the single page application when the component selected for performance testing has been reloaded, according to one illustrated implementation.

DETAILED DESCRIPTION

Figure 1:
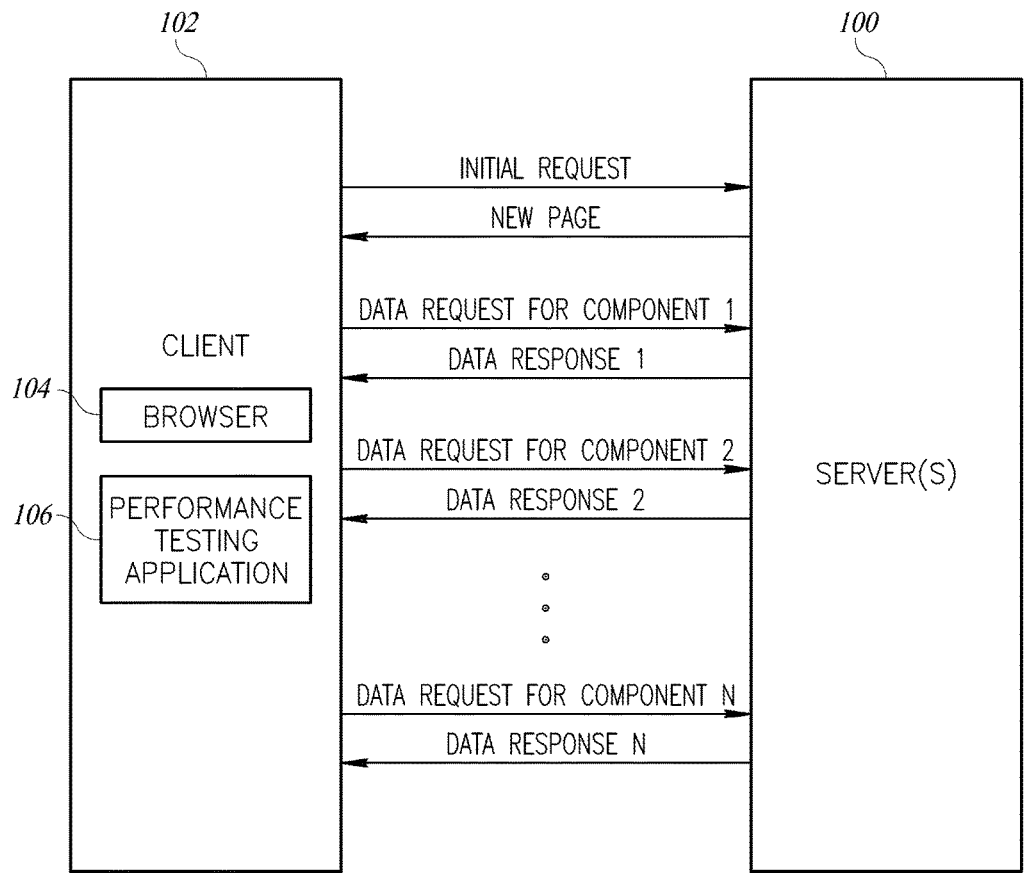
FIG. 1 is a functional block diagram of a server processor-based system and a client processor-based system implementing a single page application, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense, including "and/or" unless the context clearly dictates otherwise.

The headings and Abstract of the Disclosure provided herein are for convenience only and do not interpret the scope or meaning of the implementations.

Implementations of the present disclosure are directed to systems and methods for improving the performance of processor-based systems by benchmarking and/or optimizing software applications executing on the processor-based systems. In one or more implementations, such functionality is achieved by measuring the rendering time for individual components of a software application, such as a single page application (SPA).

Generally, with a known dataset loaded in an application executing on a processor-based system, a user may identify a plurality of components of the application which are to be benchmarked, as well as corresponding calls to one or more servers for data. Baseline screenshots may be captured for those specific screen regions associated with the selected components. The baseline screenshots and component information may be stored as a configuration file in a nontransitory processor-readable storage medium of the processor-based system, for example.

After invalidating associated application caches, the processor-based system may reload one or more components of the application based on the stored configuration file. The processor-based system may mark when an identified server data call response completes as a rendering starting time for a component, and may begin iteratively taking test screenshots of the specified regions and comparing each test screenshot to its corresponding baseline screenshot. When a match is found, or a timeout is reached, the processor-based system may stop processing for the particular screen region. If a match is found, the processor-based system marks the time the match is found as a rendering completion time for the component. Once all regions have completed rendering, the processor-based system may subtract the rendering completion time from the rendering start time to determine the amount of time it took for the client application to render that component. The implementations discussed herein are browser-, platform- and application-agnostic, which allow such implementations to benchmark rendering performance in a variety of scenarios.

FIG. 1 illustrates a schematic functional diagram for a single page application (SPA) provided by one or more server processor-based systems 100 to a client or user processor-based system 102 over a network, such as the Internet. Example functional components of the server processor-based systems 100 and the client processor-based system 102 are shown in FIG. 3 and discussed below. The client processor-based system 102 may execute a Web browser 104, such as a Web Browser 200 shown in FIG. 2. The client processor-based system 102 may also execute a performance testing application 106 which implements the testing/benchmarking functionality discussed below.

In a traditional Web application executing in a browser, each time the application calls the server 100, the server renders a new page (e.g., HTML page). This action triggers a page refresh in the browser. In a single page application, the application may send an initial request to the server 100, which may respond by providing a new page which is rendered by the browser 104 of the client processor-based system 102. Unlike traditional Web applications, in a single page application, after the first page loads, all interaction with the server 100 happens through data requests (e.g., Asynchronous JavaScript and XML (AJAX) calls) for particular components. These data requests cause the server(s) 100 to return data (e.g., JavaScript Object Notation (JSON) formatted data) for the particular component. As shown in FIG. 1, for each data request for components 1-N, the server(s) provide corresponding data responses 1-N. The single page application uses the data received from the server(s) 100 to update the page dynamically, without reloading the page.

Figure 2:
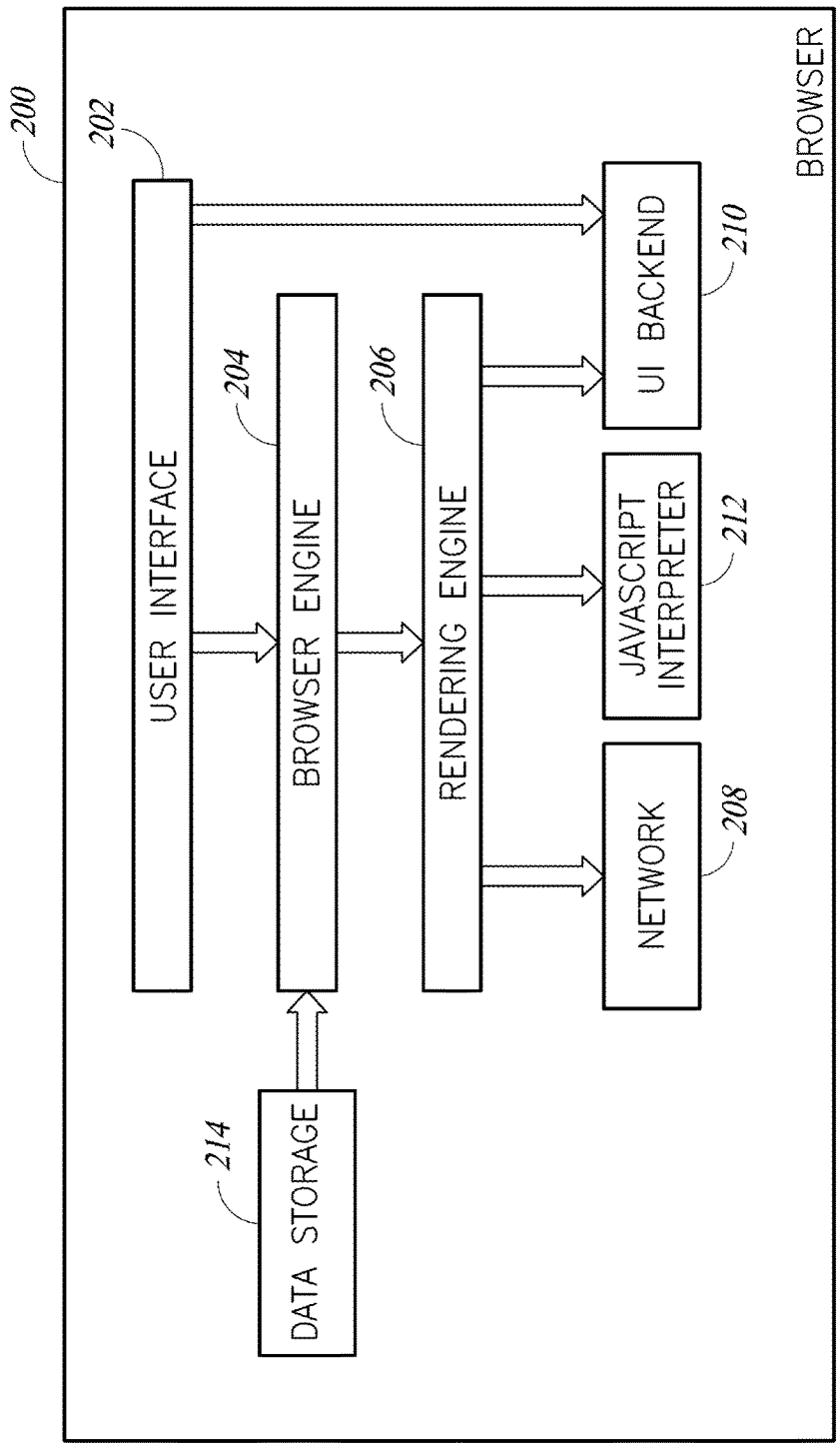
FIG. 2 is a functional block diagram of a Web browser executable on a client processor-based system, according to one illustrated implementation.
Figure 3:
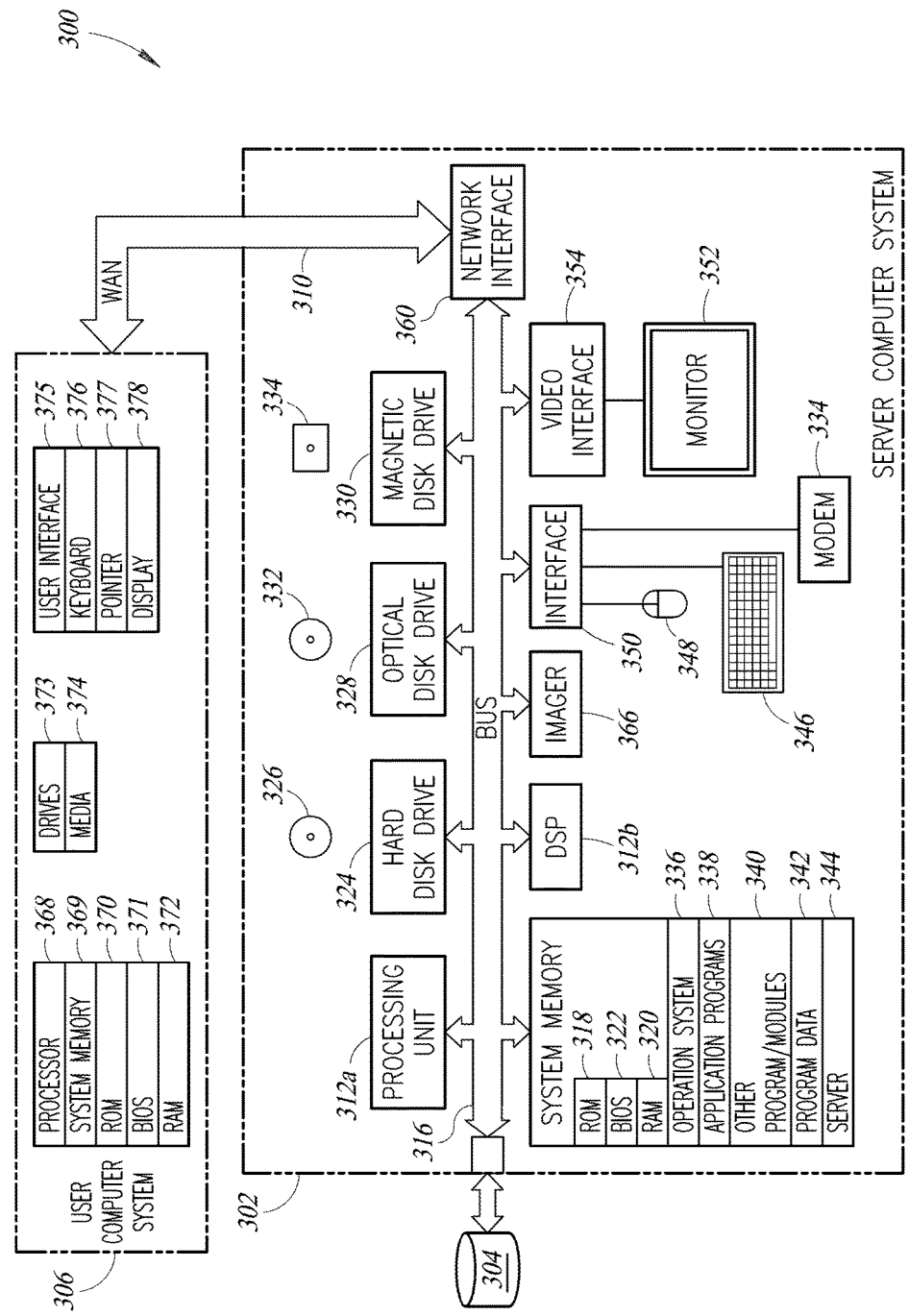
FIG. 3 is a functional block diagram of a server processor-based system and a client processor-based system, according to one illustrated implementation.

FIG. 2 shows example functional components of a Web browser 200 which may be used to present a web application, such as a single page application, on a user processor-based system. The Web browser 200 may be executed by any suitable processor-based system, such a desktop computer, laptop computer, tablet computer, smartphone, wearable computer, etc. As discussed above, the main functionality of the browser 200 is to present the application by requesting the application from one or more servers and displaying the application in a browser window. The resource format may usually be HTML but may also be PDF, image, video, etc.

The browser 200 includes several components including a user interface 202, a browser engine 204, a rendering or layout engine 206, a networking module 208, a user interface backend 210, a JavaScript interpreter 212, and data storage 214. The user interface 202 may include an address bar, back/forward button, bookmarking menu, etc. Generally, the user interface 202 may include each part of the browser display except the main window where content is displayed. The browser engine 204 may be the interface for querying and manipulating the rendering engine 206. The networking module 208 may be used for network calls, such as HTTP requests or component data requests. The networking module 208 may have a platform independent interface. The user interface backend 210 may be used for drawing basic widgets, such as combo boxes or windows. The user interface backend 210 may expose a generic interface which is not platform specific. The JavaScript interpreter 212 may be used to parse and execute JavaScript code. The data storage 214 may be a persistence layer which is used by the browser 200 to save various data (e.g., cookies).

The rendering engine 206 is generally responsible for displaying the requested content. For example, if the requested content is HTML, the rendering engine 206 is responsible for parsing the HTML and CSS and displaying the parsed content on the screen of the client processor-based system.

FIG. 3 shows a networked environment 300 comprising one or more server computer systems 302 (only one illustrated) and one or more associated nontransitory computer- or processor-readable storage medium 304 (only one illustrated). The associated nontransitory computer- or processor-readable storage medium 304 is communicatively coupled to the server computer system(s) 302 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The networked environment 300 also includes one or more client or user processor-based systems 306 (only one illustrated). For example, the user processor-based systems 306 may be representative of the client processor-based system 102 of FIG. 1. The user processor-based systems 306 are communicatively coupled to the server computer system(s) 302 by one or more communications channels, for example, one or more wide area networks (WANs) 310, for instance the Internet or Worldwide Web portion thereof.

In operation, the user processor-based systems 306 typically function as a client to the server computing system 302. In operation, the server computer systems 302 typically functions as a server to receive requests or information from the user processor-based systems 306.

The networked environment 300 may employ other computer systems and network equipment, for example, additional servers, proxy servers, firewalls, routers and/or bridges. The server computer systems 302 will at times be referred to in the singular herein, but this is not intended to limit the implementations to a single device since in typical implementations there may be more than one server computer systems 302 involved. Unless described otherwise, the construction and operation of the various blocks shown in FIG. 3 are of conventional design. As a result, such blocks need not be described in further detail herein, as they will be understood by those skilled in the relevant art.

The server computer systems 302 may include one or more processing units 312a, 312b (collectively 312), a system memory 314 and a system bus 316 that couples various system components, including the system memory 314 to the processing units 312. The processing units 312 may be any logic processing unit, such as one or more central processing units (CPUs) 312a, digital signal processors (DSPs) 312b, application-specific integrated circuits (ASICs), field programmable gate arrays (FPGAs), etc. The system bus 316 can employ any known bus structures or architectures, including a memory bus with memory controller, a peripheral bus, and/or a local bus. The system memory 314 includes read-only memory ("ROM") 318 and random access memory ("RAM") 320. A basic input/output system ("BIOS") 322, which can form part of the ROM 318, contains basic routines that help transfer information between elements within the server computer system(s) 302, such as during start-up.

The server computer systems 302 may include a hard disk drive 324 for reading from and writing to a hard disk 326, an optical disk drive 328 for reading from and writing to removable optical disks 332, and/or a magnetic disk drive 330 for reading from and writing to magnetic disks 334. The optical disk 332 can be a CD-ROM, while the magnetic disk 334 can be a magnetic floppy disk or diskette. The hard disk drive 324, optical disk drive 328 and magnetic disk drive 330 may communicate with the processing unit 312 via the system bus 316. The hard disk drive 324, optical disk drive 328 and magnetic disk drive 330 may include interfaces or controllers (not shown) coupled between such drives and the system bus 316, as is known by those skilled in the relevant art. The drives 324, 328 and 330, and their associated computer-readable media 326, 332, 334, provide nonvolatile storage of computer-readable instructions, data structures, program modules and other data for the server computer system 302. Although the depicted server computer systems 302 is illustrated employing a hard disk 324, optical disk 328 and magnetic disk 330, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 314, such as an operating system 336, one or more application programs 338, other programs or modules 340 and program data 342. The system memory 314 may also include communications programs, for example, a server 344 that causes the server computer system 302 to serve electronic information or files via the Internet, intranets, extranets, telecommunications networks, or other networks as described below. The server 344 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 3 as being stored in the system memory 314, the operating system 336, application programs 338, other programs/modules 340, program data 342 and server 344 can be stored on the hard disk 326 of the hard disk drive 324, the optical disk 332 of the optical disk drive 328 and/or the magnetic disk 334 of the magnetic disk drive 330.

An operator can enter commands and information into the server computer system(s) 302 through input devices such as a touch screen or keyboard 346 and/or a pointing device such as a mouse 348, and/or via a graphical user interface. Other input devices can include a microphone, joystick, game pad, tablet, scanner, etc. These and other input devices are connected to one or more of the processing units 312 through an interface 350 such as a serial port interface that couples to the system bus 316, although other interfaces such as a parallel port, a game port or a wireless interface or a universal serial bus ("USB") can be used. A monitor 352 or other display device is coupled to the system bus 316 via a video interface 354, such as a video adapter. The server computer system(s) 302 can include other output devices, such as speakers, printers, etc.

The server computer systems 302 can operate in a networked environment 300 using logical connections to one or more remote computers and/or devices. For example, the server computer systems 302 can operate in a networked environment 300 using logical connections to one or more user processor-based systems 306. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the server computer systems 302, the user processor-based systems 306.

The user processor-based systems 306 will typically take the form of end user processor-based devices, for instance, personal computers (e.g., desktop or laptop computers), net book computers, tablet computers, smartphones, personal digital assistants, vehicle head units, wearable computers, workstation computers and/or mainframe computers, and the like, executing appropriate instructions. These user processor-based systems 306 may be communicatively coupled to one or more server computers. For instance, user processor-based systems 306 may be communicatively coupled externally via one or more end user client entity server computers (not shown), which may implement a firewall. The server computers 302 may execute a set of server instructions to function as a server for a number of user processor-based systems 306 (e.g., clients) communicatively coupled via a LAN at a facility or site, and thus act as intermediaries between the user processor-based systems 306 and the server computer system(s) 302. The user processor-based systems 306 may execute a set of client instructions to function as a client of the server computer(s), which are communicatively coupled via a WAN.

The user processor-based systems 306 may include one or more processing units 368, system memories 369 and a system bus (not shown) that couples various system components including the system memory 369 to the processing unit 368. The user processor-based systems 306 will, at times, each be referred to in the singular herein, but this is not intended to limit the implementations to a single user processor-based systems 306. In typical implementations, there may be more than one user processor-based system 306 and there will likely be a large number of user processor-based systems 306.

The processing unit 368 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, a Snapdragon processor from Qualcomm, an Exynos processor from Samsung, or an Ax processor from Apple. Unless described otherwise, the construction and operation of the various blocks of the user processor-based systems 306 shown in FIG. 3 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 369 includes read-only memory ("ROM") 370 and random access memory ("RAM") 372. A basic input/output system ("BIOS") 371, which can form part of the ROM 370, contains basic routines that help transfer information between elements within the end user client computer systems 306, such as during start-up.

The user processor-based systems 306 may also include one or more media drives 373, e.g., a hard disk drive, magnetic disk drive, WORM drive, and/or optical disk drive, for reading from and writing to computer-readable storage media 374, e.g., hard disk, optical disks, and/or magnetic disks. The nontransitory computer-readable storage media 374 may, for example, take the form of removable media. For example, hard disks may take the form of a Winchester drive, and optical disks can take the form of CD-ROMs, while magnetic disks can take the form of magnetic floppy disks or diskettes. The media drive(s) 373 communicate with the processing unit 368 via one or more system buses. The media drives 373 may include interfaces or controllers (not shown) coupled between such drives and the system bus, as is known by those skilled in the relevant art. The media drives 373, and their associated nontransitory computer-readable storage media 374, provide nonvolatile storage of computer readable instructions, data structures, program modules and other data for the user processor-based systems 306. Although described as employing computer-readable storage media 374 such as hard disks, optical disks and magnetic disks, those skilled in the relevant art will appreciate that user processor-based systems 306 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 374.

Program modules, such as an operating system, one or more Web browsers, one or more application programs, other programs or modules and program data, can be stored in the system memory 369. Program modules may include instructions for accessing a Website, extranet site or other site or services (e.g., Web services) and associated Webpages, other pages, screens or services hosted by the server computer system 114.

In particular, the system memory 369 may include communications programs that permit the user processor-based systems 306 to exchange electronic or digital information or files or data or metadata with the server computer system 302. The communications programs may, for example, be a Web client or browser that permits the user processor-based systems 306 to access and exchange information, files, data and/or metadata with sources such as Websites of the Internet, corporate intranets, extranets, or other networks. Such may require that the user processor-based systems 306 have sufficient right, permission, privilege or authority for accessing a given Website, for example, one hosted by the sever computer system(s) 302. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 369, the operating system, application programs, other programs/modules, program data and/or browser can be stored on the computer-readable storage media 374 of the media drive(s) 373. An operator can enter commands and information into the user processor-based systems 306 via a user interface 375 through input devices such as a touch screen or keyboard 376 and/or a pointing device 377 such as a mouse. Other input devices can include a microphone, joystick, game pad, tablet, imager, scanner, etc. These and other input devices are connected to the processing unit 368 through an interface such as a serial port interface that couples to the system bus, although other interfaces such as a parallel port, a game port or a wireless interface or a universal serial bus ("USB") can be used. A display or monitor 378 may be coupled to the system bus via a video interface, such as a video adapter. The user processor-based systems 306 can include other output devices, such as speakers, printers, etc.

Figure 4:
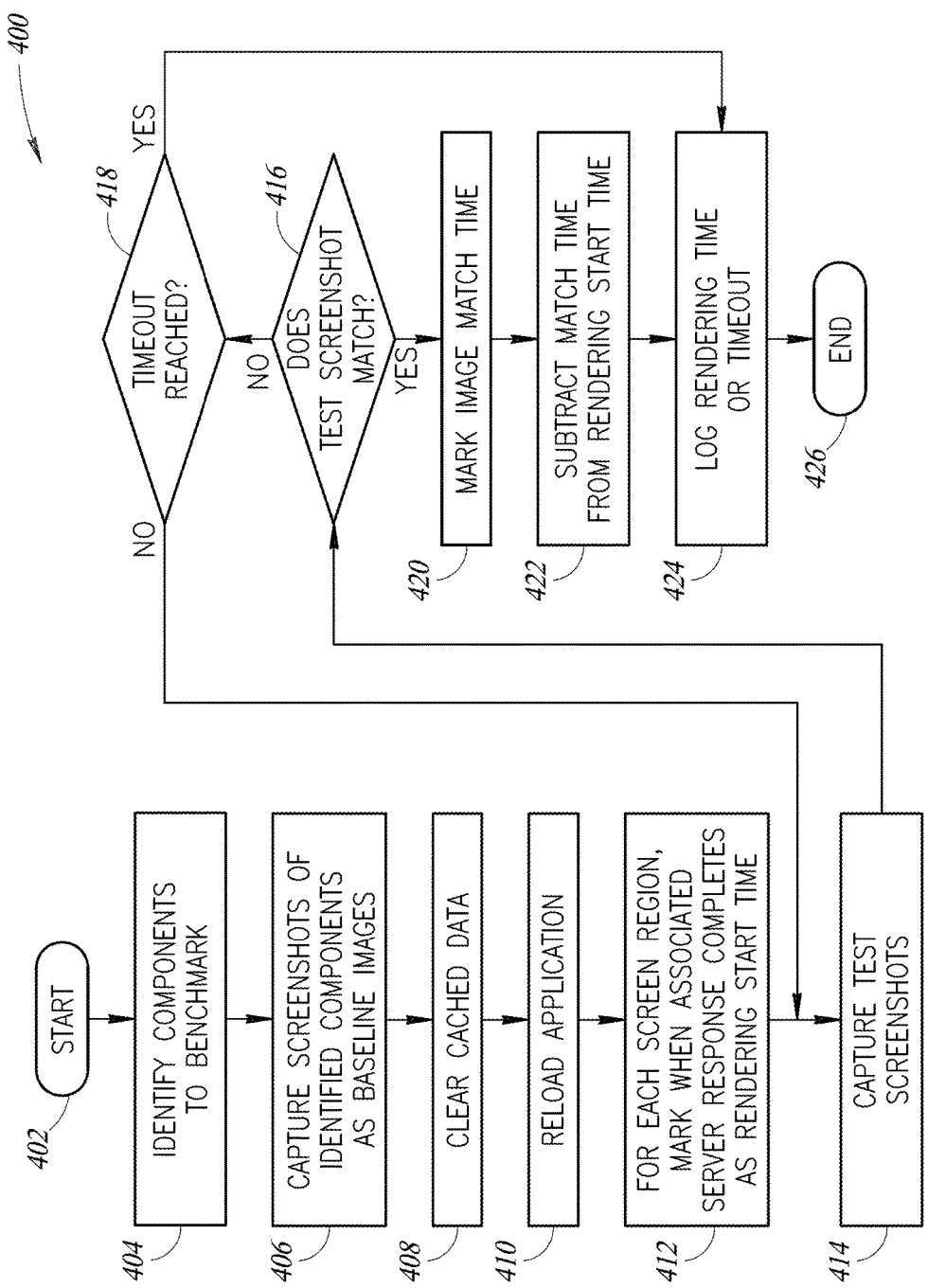
FIG. 4 is a flow diagram for a method of performance testing individual components of a software application, according to one illustrated implementation.

FIG. 4 shows a flow diagram for a method 400 of operation of a processor-based system to test performance of a single page application. The method 400 may be implemented by a performance testing application (e.g., the performance testing application 106 of FIG. 1) executing on a user processor-based system, for example. FIGS. 5, 6, 7, 8 and 9 illustrates screenshots 500, 600, 700, 800 and 900, respectively, of the single page application at times which correspond to acts of the method 400.

The method 400 starts at 402. For example, the method 400 may start with a known dataset loaded in an SPA executing in a browser of a processor-based system.

Figure 5:
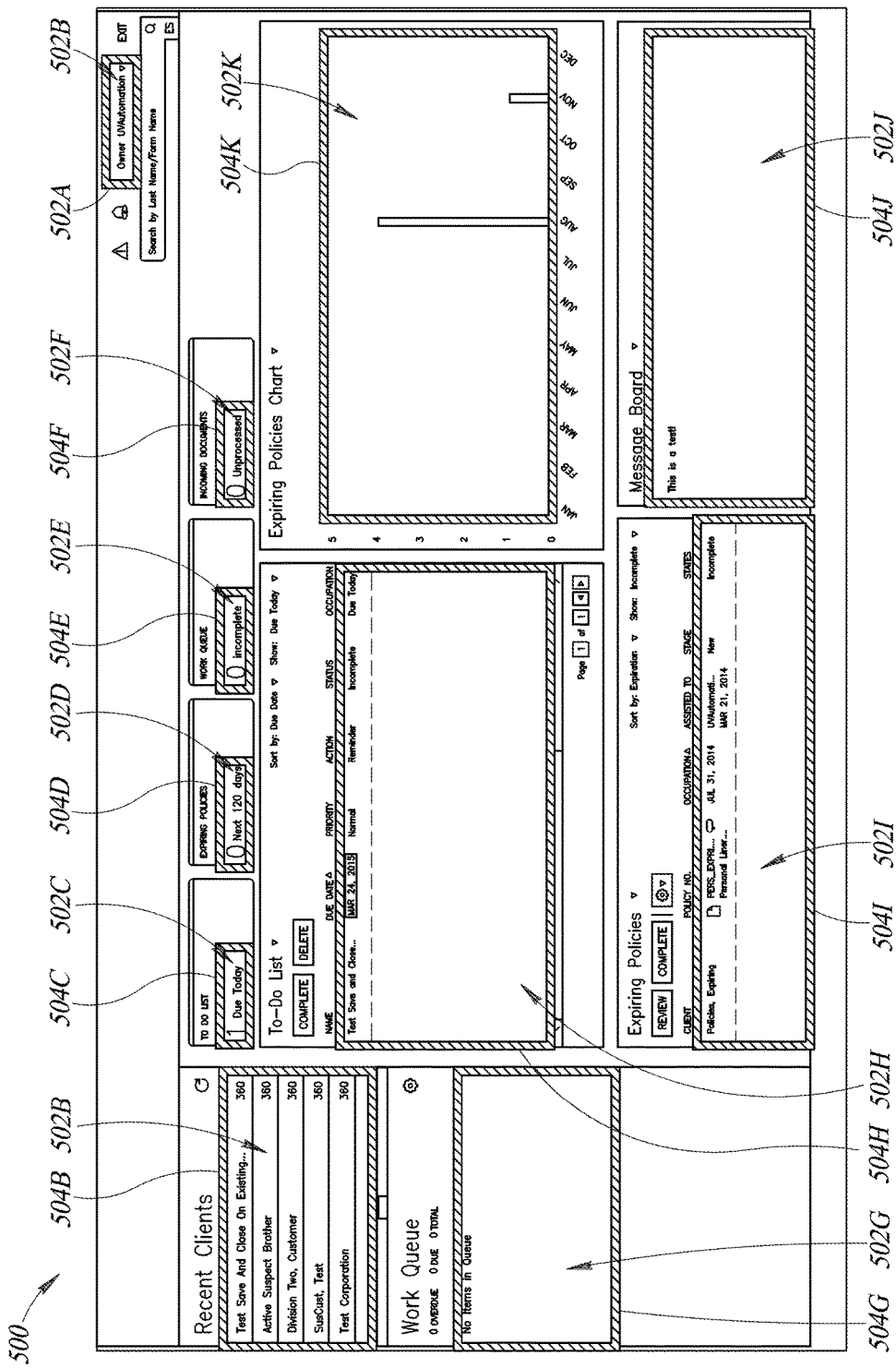
FIG. 5 is a screenshot of a single page application which includes a plurality of individual components which are rendered separately, according to one illustrated implementation.

FIG. 5 shows the screenshot 500 of the single page application. The application includes a plurality of individual components 502A-502K (collectively, "components 502") positioned at various regions 504A-504K (collectively, "regions 504"), respectively, within the display screen of the application. In the example of FIG. 5, each of the regions 504A-504K defined by a rectangular border is populated with data from a separate server data call and is rendered individually.

At 404, at least one processor of the processor-based system may identify one or more of the components to benchmark. For example, as shown in the screenshot 600 of FIG. 6, at least one processor may identify the component 502K (and the corresponding region 504K) as a component for which the rendering time is to be measured.

At least one processor may receive the selection/identification of the components/regions in many different ways. For example, the user may select a region on the display screen of the processor-based system by "drawing" a rectangle around the region using a suitable input device (e.g., mouse, touchscreen, keyboard, stylus). As another example, the user may select one or more components from a list of components presented via a suitable graphical user interface, such as a drop down list, selectable icons, selectable image(s), etc. In some implementations, the user may select a particular region of the display screen which causes a prompt to be presented to the user to input a label for the component contained in the region. In some implementations, the processor-based system may automatically determine a label or name for a component based on the user's selection of a region of the display screen which includes the component.

Figure 6:
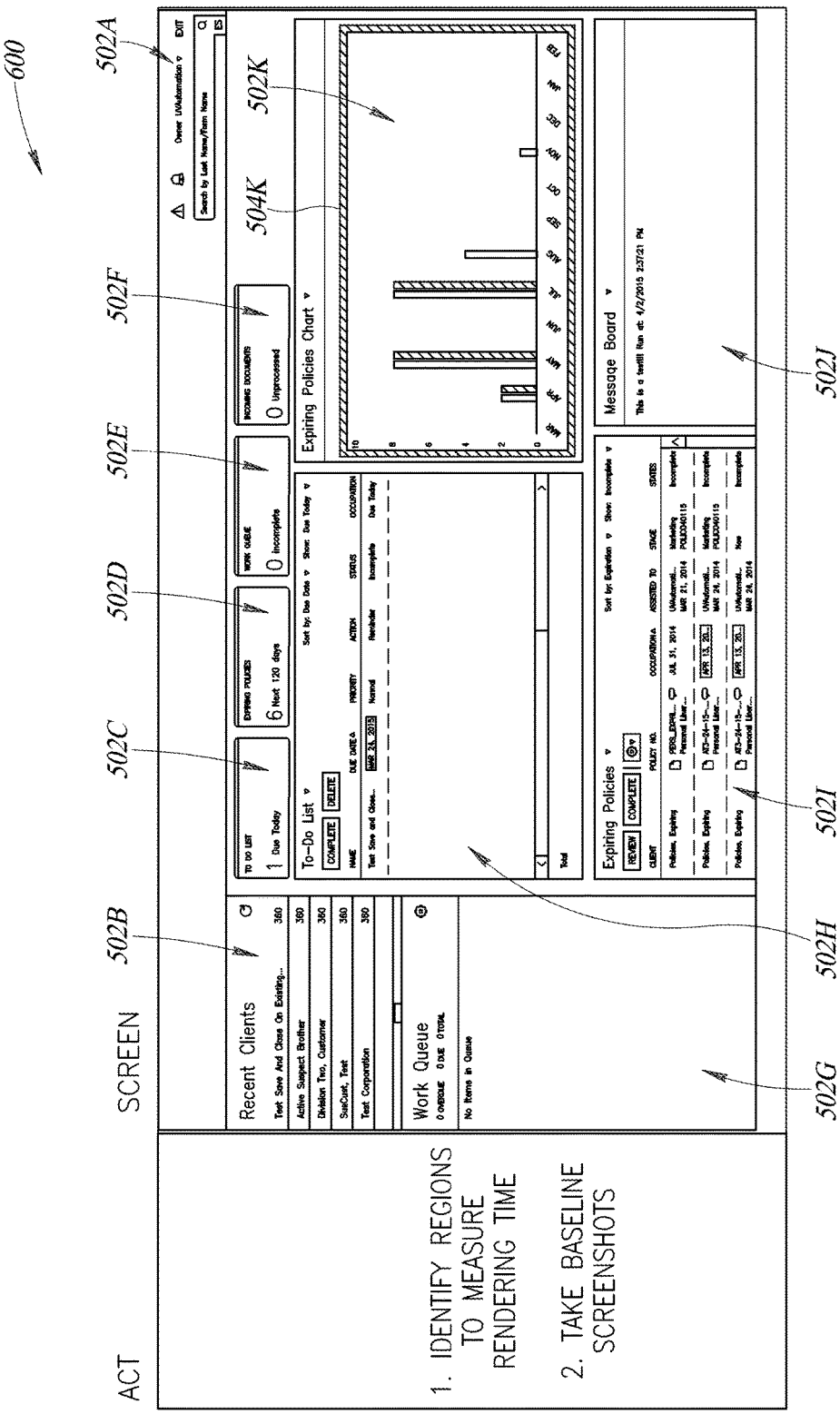
FIG. 6 is a screenshot of the single page application which shows selection of a region corresponding to a component of the application which is to be tested, according to one illustrated implementation.

At 406, at least one processor of the processor-based system may capture a baseline screenshot for each selected component. In the example of FIG. 6, at least one processor may capture a baseline screenshot for the region 504K which corresponds to the selected component 502K. It is noted that although only one component is shown as being selected in the illustrated example for explanatory purposes, in practice a user may select numerous components of the application. Each of the captured baseline screenshots may be logically associated with a corresponding component in a configuration file stored in a nontransitory processor-readable storage medium of the processor-based system.

At 408, at least one processor may clear or invalidate any cached data associated with any of the selected components which are to be tested. Such ensures each of the selected components are fully re-rendered using data from the respective server call and not rendered using data existing in a cache of the processor-based system.

At 410, at least one processor causes the application to be reloaded. As discussed above, such may be achieved by causing data requests for each of the components to be sent to respective servers for each of the components. In some implementations, at least one processor causes the full application to be reloaded.

Figure 7:
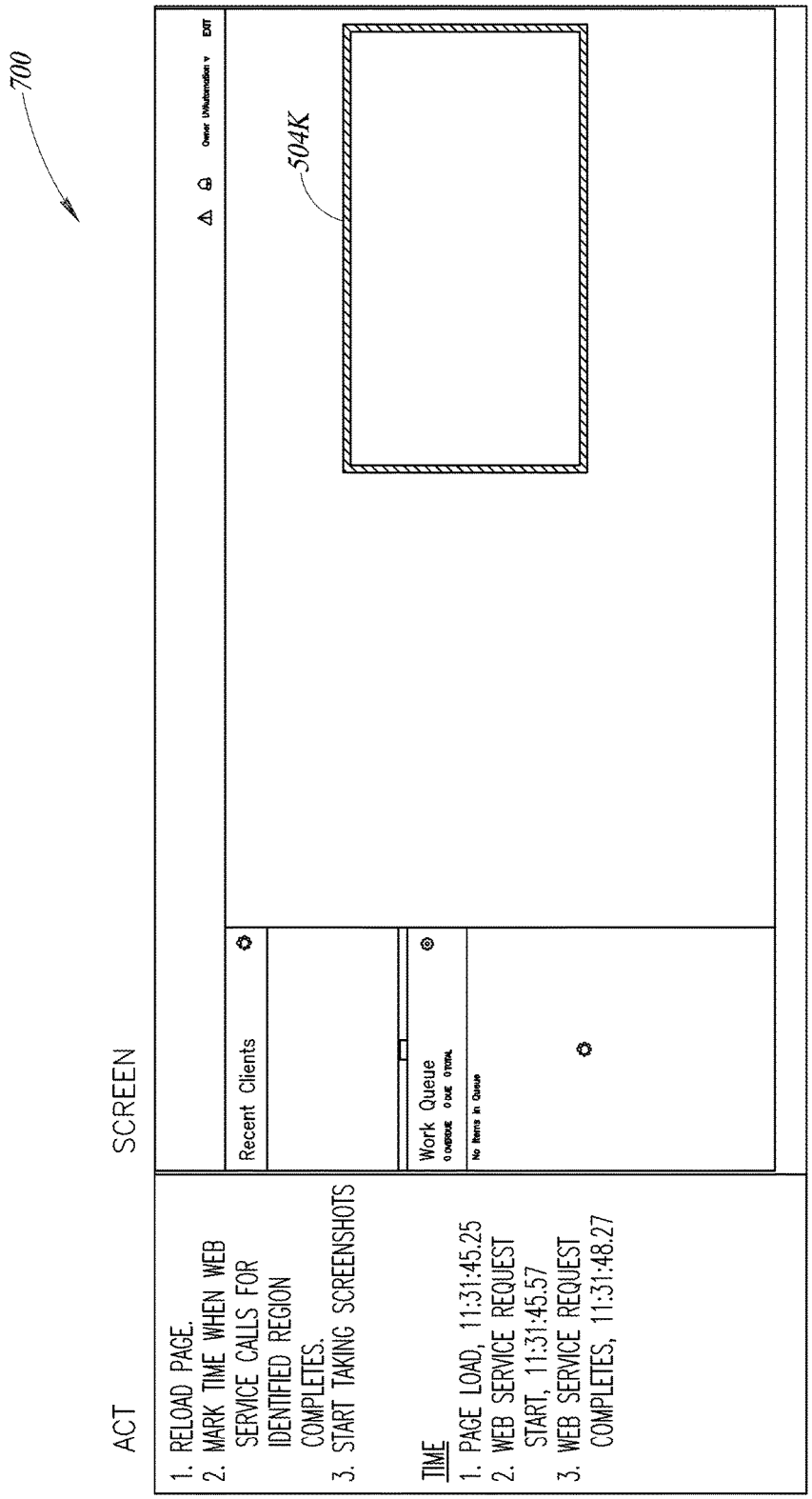
FIG. 7 is a screenshot of the single page application when the single page application is reloading, according to one illustrated implementation.

At 412, for each screen region, at least one processor marks the time when the associated server response completes. Such time maybe referred to as a start rendering time for each component. The screenshot 700 of FIG. 7 shows the application when at least one processor detects the completion of the associated server response for the selected component 502K at a time 11:31:48.270.

Figure 8:
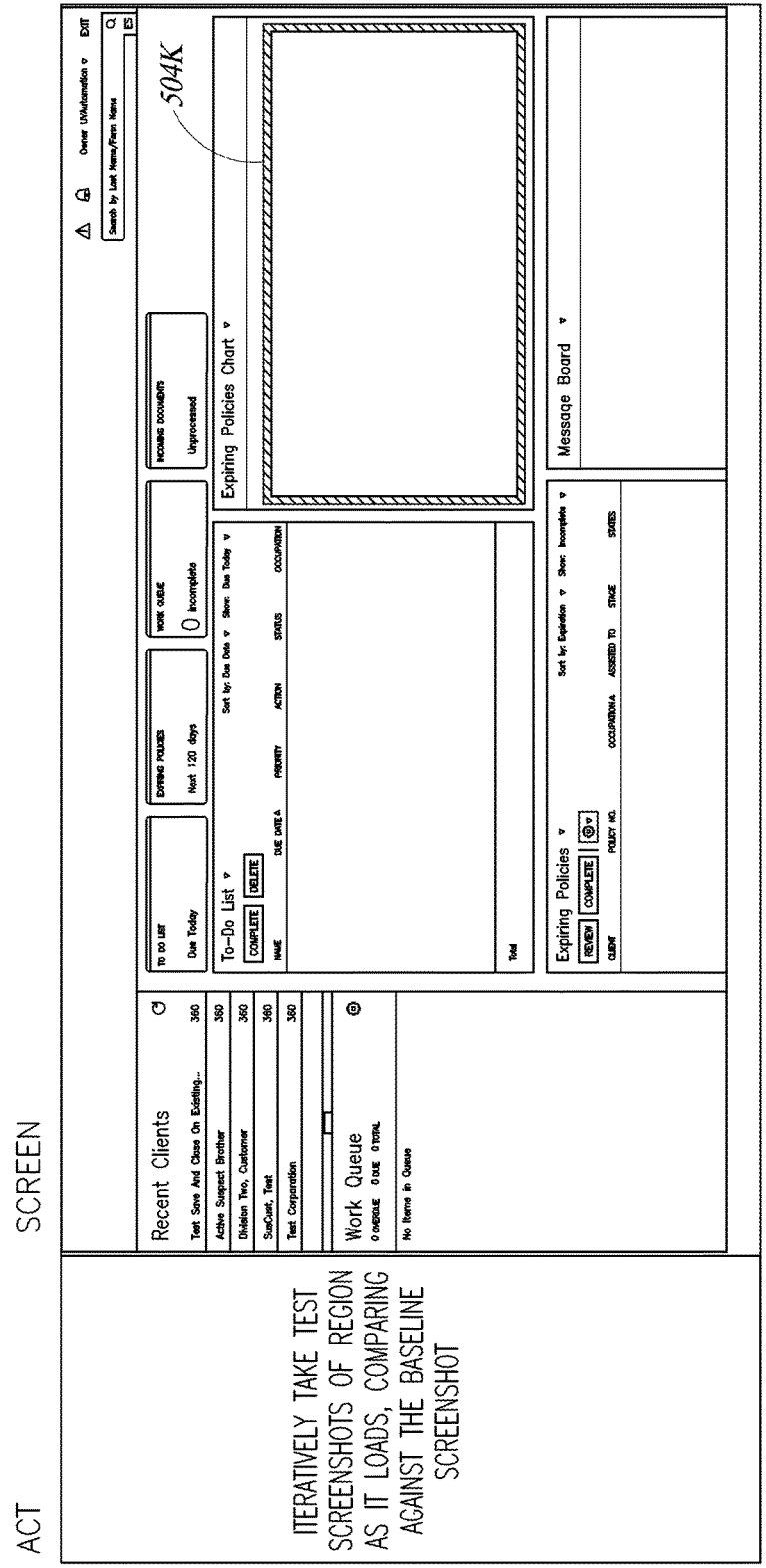
FIG. 8 is a screenshot of the single page application when the component selected for performance testing is reloading, according to one illustrated implementation.

At 414, at least one processor of the processor-based system may capture a test screenshot of each screen region associated with a selected component of the application. The screenshot 800 of FIG. 8 shows the application when the region 504K corresponding to the component 502K has not been rendered, so the test screenshot captured at this time does not match the baseline screenshot for the region.

At 416, at least one processor may determine whether the captured test screenshot for each region matches a corresponding baseline screenshot image for the region. For each region, if the test screenshot does not match the baseline screenshot image (i.e., 416="no"), the at least one processor may iteratively capture test screenshots and compare each to a corresponding baseline screenshot image until a match is found. At 418, at least one processor may check to see if a timeout condition is reached so that the method 400 does not continue indefinitely when no match is found.

One or more of a number of suitable algorithms may be used to determine whether a test screenshot image matches a baseline screenshot image. Non-limiting examples of matching algorithms include pixel-by-pixel based matching, feature based matching (e.g., scale-invariant feature transform (SIFT), speeded up robust features (SURF), Features from accelerated segment test (FAST)), least squares matching, correlation matching, genetic algorithm matching, and area based matching. The matching algorithm may utilize one or more thresholds which control the degree of similarity required for a test screenshot image to be considered a sufficient match with a corresponding baseline screenshot image.

At 420, upon detecting that a test screenshot image for a region matches its corresponding baseline screenshot image, at least one processor may mark the time at which the match was found as the rendering completion time for that region/component. For example, the screenshot 900 of FIG. 9 shows that the region 504K corresponding to the component 502K has been fully re-rendered, so the test screenshot captured at this time matches the baseline screenshot for the region. As indicated in FIG. 9, the time at which the match was found in this example is 11:31:48.880.

At 422, at least one processor may subtract the rendering completion time ("match found time") for each region from its corresponding rendering start time to obtain the rendering execution time or "rendering time" for the component. In the example of FIG. 9, the rendering time for the component 502K is determined to be 11:31.48.880−11:31.48.270=610 milliseconds.

At 424, at least one processor may log the determined rendering times for each of the selected components of the application in a nontransitory processor-readable storage medium of the processor-based system. For components where no match was found, at least one processor may log that a timeout condition was reached which indicates that the rendering time was not measured for that particular component of the application. Such rendering times may be used by developers to assess and improve the performance of individual components in the application.

At 426, the method 400 ends until started again. For example, method 400 may be started each time rendering times for individual components of an application are to be tested. Further, the method 400 may be implemented autonomously as one test in a test suite including a plurality of tests, for example.

A non-limiting example of pseudocode which may be used to implement the method 400 of FIG. 4 is provided below:

```
namespace PerfImageDiffPOC
{
    class Program
    {
        PerfCore pc = new PerfCore( );
        pc.GetPerformanceNumbers(some parameters defining
        screen regions to validate);
    }
    public class PerfCore
    {
        public PerfCore( )
        public Dictionary<string,
        PerfResult>GetPerformanceNumbers(parameters)
        {
            List crList = new List( );
            //Based on parameter inputs, create a list of screen regions
            to process
            foreach screenRegion in parameters.regions
            {
                crList.Add(new ComponentRegion(screenRegion));
            }
            //Queue up threads to handle the processing
            foreach(ComponentRegion cr in crList)
            {
                ThreadPool.QueueUserWorkItem(cr.GetPerformance);
            }
            //Wait for all the processing to take place
            WaitHandle.WaitAll( );
            Dictionary results = new Dictionary( );
            //Parse the results and add them to the output list
            foreach(string s in PerfResults.Keys)
            {
                results.Add(s, PerfResults[s])
            }
            return results;
        }
    }
    public class PerfResult
    {
        public TimeSpan elapsed;
    }
    internal class ComponentRegion
    {
        internal Bitmap baseImage;
        internal Point origin;
```

```
        internal Size size;
        internal DateTime timeOut;
        internal bool matched;
        internal string name;
        private ManualResetEvent _doneEvent;
        public ComponentRegion( )
        {
        }
    }
    //This function handles grabbing the screen regions
    to be compared
    internal void GetPerformance( )
    {
        DateTime start = DateTime.Now;
        //Define the region to compare
        Rectangle rc = new Rectangle(origin, size);
        bool matchFound = false;
        while (DateTime.Now < timeOut)
        {
            memoryImage = Place an image into memory of
            the specified screen region
            //baseImage is the pre-rendered screen region
            //the memoryImage is the screen region as it appears
            right now
            matchFound = CompareBitmapImages(baseImage,
            memoryImage);
            if (matchFound)
                break;
        }
        TimeSpan elapsed = DateTime.Now.Subtract(start);
        PerfResult pr = new PerfResult( );
        pr.elapsed = timeElapsed;
        pr.matched = matchFound;
        PerfCore.PerfResults.TryAdd(name, pr);
    }
    //This function handles comparing images
    private bool CompareBitImages(Bitmap sourceImage,
    Bitmap currentImage)
    {
        bool result = Algorithmically calculate image match between
sourceImage and currentImage;
        return result;
    }
  }
}
```

The implementations discussed herein provide numerous advantages. For example, the implementations of the present disclosure do not require any changes to the source code of the application under test. Such feature makes the implementations discussed herein browser-, platform- and application-agnostic, which allow such implementations to benchmark rendering performance in a variety of scenarios.

Further, the implementations discussed herein measure actual rendering time, not merely completion of code execution. Existing solutions which are used to measure rendering time actually only measure when processor-executable code has completely finished executing. Such existing solutions may not take into account any browser lag in processing and rendering the individual components. Because the implementations discussed herein capture images of the actual display screen, and do not analyze the processor-executable code, such implementations detect when the rendering of individual components has actually completed, thus providing a more precise view of true rendering performance.

Additionally, the implementations discussed herein are very accurate. In some implementations, for example, the process of capturing a test screenshot and analyzing the baseline rendered image against the test screenshot takes less than 100 milliseconds, even for full screen rendering. Smaller screen regions, such as the regions highlighted in FIG. 5, may only take 10-30 milliseconds or less to process, for example. Thus, the measured rendering time for each individual component is usually within 100 milliseconds or less of actual rendering time.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A processor-based system to evaluate performance of an application, the system comprising:
   at least one nontransitory processor-readable medium that stores at least one of processor-executable instructions or data; and
   at least one processor communicably coupled to the at least one nontransitory processor-readable medium, the at least one processor:
   receives a selection of a plurality of user interface components of the application rendered on a display screen of the processor-based system;
   for each of the plurality of selected user interface components, causes a corresponding plurality of baseline screenshot images to be captured, each of the baseline screenshot images depicting a region of the display screen which renders a corresponding selected user interface component;

logically associates each of the captured baseline screenshot images with a corresponding one of the selected user interface components in a nontransitory processor-readable storage medium;

for each of the selected user interface components,
causes a data call request for the user interface component to be sent to a server processor-based system;

detects a completion of a response from the server processor-based system received by the processor-based system responsive to the sent data call request;

detects a response completion time of the completion of the response from the server processor-based system, the detected response completion time indicative of a starting time at which the user interface is re-rendered responsive to the sent data call request;

logically associates the response completion time as a rendering starting time for the user interface component in the nontransitory processor-readable storage medium;

causes a test screenshot image of the region which renders the user interface component to be captured;

determines whether the captured test screenshot image matches the baseline screenshot image for the user interface component;

while the captured test screenshot image does not match the baseline screenshot image, iteratively:
causes a test screenshot image of the region which renders the user interface component to be captured; and determines whether the captured test screenshot image matches the baseline screenshot image for the user interface component;

responsive to a determination that the captured test screenshot image matches the baseline screenshot image, detects a rendering completed time which represents the time at which the captured test screenshot image was found to match the baseline screenshot image; and determines a rendering execution time for the user interface component based at least in part on the rendering completed time for the user interface component and the rendering starting time for the user interface component.

2. The system of claim 1 wherein the at least one processor:
determines a difference between the rendering completed time for the user interface component and the rendering starting time to obtain the rendering execution time for the user interface component.

3. The system of claim 1 wherein the at least one processor:
prior to causing a data call request for the user interface component to be sent to a server processor-based system, invalidates at least one cache storage which stores data for at least one of the plurality of selected user interface components of the application.

4. The system of claim 1 wherein the at least one processor:
causes a request for the application to be reloaded to be sent to the server processor-based system.

5. The system of claim 1 wherein the at least one processor:
receives a selection of a plurality of user interface components from a user via a graphical user interface of the processor-based system.

6. The system of claim 1 wherein the at least one processor:
for each of the user interface components, receives a selection of a region of the display screen of the processor-based system via a graphical user interface of the processor-based system.

7. The system of claim 1 wherein the at least one processor:
for each of the user interface components, receiving a selection of an alphanumeric label for the user interface component.

8. The system of claim 1 wherein the at least one processor:
responsive to receipt of the selection of a plurality of user interface components, determines a region for each of the plurality of corresponding baseline screenshot images.

9. The system of claim 8 wherein at least one region overlaps with at least one other region.

10. The system of claim 8 wherein each of the determined regions is a rectangular-shaped region.

11. The system of claim 1 wherein the application comprises a single page web application rendered on the display screen of the processor-based system.

12. A method of operating a processor-based system to evaluate performance of an application, the method comprising:
receiving, by at least one processor, a selection of a plurality of user interface components of the application rendered on a display screen of the processor-based system;

for each of the plurality of selected user interface components, causing, by the at least one processor, a corresponding plurality of baseline screenshot images to be captured, each of the baseline screenshot images depicting a region of the display screen which renders a corresponding selected user interface component;

logically associating, by the at least one processor, each of the captured baseline screenshot images with a corresponding one of the selected user interface components in a nontransitory processor-readable storage medium;

for each of the selected user interface components,
causing, by the at least one processor, a data call request for the user interface component to be sent to a server processor-based system;

detecting, by the at least one processor, a completion of a response from the server processor-based system received by the processor-based system responsive to the sent data call request;

detecting, by the at least one processor, a response completion time of the completion of the response from the server processor-based system, the detected response completion time indicative of a starting time at which the user interface is re-rendered responsive to the sent data call request;

logically associating, by the at least one processor, the response completion time as a rendering starting time for the user interface component in the nontransitory processor-readable storage medium;

causing, by the at least one processor, a test screenshot image of the region which renders the user interface component to be captured;

determining, by the at least one processor, whether the captured test screenshot image matches the baseline screenshot image for the user interface component;

while the captured test screenshot image does not match the baseline screenshot image, iteratively:

causing, by the at least one processor, a test screenshot image of the region which renders the user interface component to be captured; and determining, by the at least one processor, whether the captured test screenshot image matches the baseline screenshot image for the user interface component;

responsive to determining the captured test screenshot image matches the baseline screenshot image, detecting, by the at least one processor, a rendering completed time which represents the time at which the captured test screenshot image was found to match the baseline screenshot image; and determining, by the at least one processor, a rendering execution time for the user interface component based at least in part on the rendering completed time for the user interface component and the rendering starting time for the user interface component.

13. The method of claim 12 wherein determining a rendering execution time comprises determining, by the at least one processor, a difference between the rendering completed time for the user interface component and the rendering starting time to obtain the rendering execution time for the user interface component.

14. The method of claim 12, further comprising:
prior to causing a data call request for the user interface component to be sent to a server processor-based system, invalidating at least one cache storage which stores data for at least one of the plurality of selected user interface components of the application.

15. The method of claim 12 wherein causing a data call request for the user interface component to be sent to a server processor-based system comprises causing a request for the application to be reloaded to be sent to the server processor-based system.

16. The method of claim 12 wherein receiving a selection of a plurality of user interface components comprises receiving a selection of a plurality of user interface components from a user via a graphical user interface of the processor-based system.

17. The method of claim 12 wherein receiving a selection of a plurality of user interface components comprises, for each of the user interface components, receiving a selection of a region of the display screen of the processor-based system via a graphical user interface of the processor-based system.

18. The method of claim 12 wherein receiving a selection of a plurality of user interface components comprises, for each of the user interface components, receiving a selection of an alphanumeric label for the user interface component.

19. The method of claim 12, further comprising:
responsive to receiving the selection of a plurality of user interface components, determining, by the at least one processor, a region for each of the plurality of corresponding baseline screenshot images.

20. The method of claim 19 wherein determining a region for each of the plurality of corresponding baseline screenshot images comprises determining a region for each of the plurality of corresponding baseline screenshot images, at least one region overlaps with at least one other region.

21. The method of claim 19 wherein determining a region for each of the plurality of corresponding baseline screenshot images comprises determining a rectangular-shaped region for each of the plurality of corresponding baseline screenshot images.

22. The method of claim 12 wherein receiving, by at least one processor, a selection of a plurality of user interface components of the application rendered on a display screen of the processor-based system comprises receiving a selection of a plurality of user interface components of a single page web application rendered on the display screen of the processor-based system.

23. A method of operating a processor-based system to evaluate performance of an application, the method comprising:

for each of a plurality of user interface components, causing, by the at least one processor, a corresponding plurality of baseline screenshot images to be captured, each of the baseline screenshot images depicting a region which renders a corresponding user interface component;

causing, by the at least one processor, a reload request for the application to be sent to a server processor-based system;

for each of the user interface components,
detecting, by the at least one processor, a completion of a response from the server processor-based system received by the processor-based system;

detecting, by the at least one processor, a response completion time of the completion of the response from the server processor-based system;

logically associating, by the at least one processor, the response completion time as a rendering starting time for the user interface component in a nontransitory processor-readable storage medium;

causing, by the at least one processor, a test screenshot image of the region which renders the user interface component to be captured;

determining, by the at least one processor, whether the captured test screenshot image matches the baseline screenshot image for the user interface component;

while the captured test screenshot image does not match the baseline screenshot image, iteratively:

causing, by the at least one processor, a test screenshot image of the region which renders the user interface component to be captured; and determining, by the at least one processor, whether the captured test screenshot image matches the baseline screenshot image for the user interface component;

responsive to determining the captured test screenshot image matches the baseline screenshot image, detecting, by the at least one processor, a rendering completed time which represents the time at which the captured test screenshot image was found to match the baseline screenshot image; and determining, by the at least one processor, a rendering execution time for the user interface component based at least in part on the rendering completed time for the user interface component and the rendering starting time for the user interface component.

* * * * *